United States Patent [19]

Nijland et al.

[11] Patent Number: 5,002,835

[45] Date of Patent: Mar. 26, 1991

[54] ARMATURE INSERT

[75] Inventors: Peter L. J. Nijland, Losser; Gerrit A. Albers, Hengelo, both of Netherlands

[73] Assignee: Vernay Laboratories, Inc., Yellow Springs, Ohio

[21] Appl. No.: 480,395

[22] Filed: Feb. 15, 1990

[51] Int. Cl.⁵ ............................. H01F 3/00; H01F 7/08
[52] U.S. Cl. ...................................... 428/577; 428/586; 428/542.8; 335/261
[58] Field of Search ............... 428/571, 572, 573, 574, 428/575, 577, 583, 584, 586, 465, 542.8, 35.8, 36.8; 335/261, 279

[56] References Cited

U.S. PATENT DOCUMENTS

| | | | |
|---|---|---|---|
| 653,912 | 7/1900 | Heggie | 425/586 |
| 2,126,893 | 8/1938 | Klamp | 428/572 |
| 2,988,675 | 6/1961 | Bancroft | 335/261 |
| 3,013,768 | 12/1961 | Mastra | 335/261 |
| 3,082,359 | 3/1963 | Magiafico et al. | 335/261 |
| 3,510,814 | 5/1970 | Nordfors | 335/279 |
| 3,561,246 | 2/1971 | Verdickt | 428/586 |

Primary Examiner—John J. Zimmerman
Attorney, Agent, or Firm—Biebel, French & Nauman

[57] ABSTRACT

A metal insert is provided for use in forming an elastomer-tipped armature to a precise length. The insert is formed as an elongated member with a central hole passing through its length, and an elastomer element is molded within the hole. A circumferential groove is formed in the exterior surface of the insert to create a weakened "hinge" point in the insert wall such that, as mold elements for forming the elastomer element engage opposing ends of the insert, the insert may be compressed longitudinally at the groove to thereby decrease the overall length of the completed armature to within a predetermined tolerance.

8 Claims, 2 Drawing Sheets

ARMATURE INSERT

BACKGROUND OF THE INVENTION

The present invention relates generally to elastomer-tipped metallic armatures and, more particularly, to an insert for use in an armature construction in which the length of the elastomer portion of the armature may be precisely controlled during the manufacture thereof.

Elastomer-tipped metallic armatures of various configurations are commonly used in electric solenoid assemblies used in fluid control applications. A typical armature is formed with a cylindrical metal body or insert which has a cavity or hole formed lengthwise in one end or which may extend through the entire length of the insert. An elastomer element is mounted within the hole and may extend beyond the end of the metal insert or it may have an end surface which is recessed behind the end surface of the insert. The elastomer tip formed at the end of the armature insert provides an effective means for forming a seal with another surface of the solenoid assembly to prevent fluid leaks, as well as forming a resilient contact surface for avoiding excessive wear between the sealing surfaces of the solenoid.

In many applications, the effectiveness of the solenoid assembly in operating in a leak-free manner depends on precisely controlling the length of the armature and, in particular, controlling the length of the elastomer element during the manufacture of the armature. The armature is conventionally formed by fabricating the metal insert, such that the length of the insert falls within certain specified tolerances and, subsequently, mounting the insert in a mold for molding and bonding the elastomer element in place within the insert. Finally, the elastomer element is ground down to place the overall armature length within the required tolerances for its application.

The armature construction described above suffers from the limitations imposed by the accuracy to which the elastomer grinding operation can be performed, which controls the tolerance limits within which the armature length can be maintained. In addition, if the armature design requires that the elastomer element be molded with the ends recessed from the ends of the metal insert, it may be difficult or impossible to grind the elastomer element down to the proper length dimensions.

Thus, there is a need to provide an armature construction by which the length of the armature of a solenoid assembly can be more precisely controlled and, in particular, there is a need for an armature construction in which the length of the elastomer element may be simply and precisely controlled.

SUMMARY OF THE INVENTION

In accordance with the present invention, a metal insert is provided for forming an elastomer-tipped metallic armature in which an elastomer element is molded within a hole formed within the metal insert, and in which the length of the elastomer element, as well as the armature, may be controlled within a predetermined tolerance during the molding operation.

In the preferred embodiment, variations in the lengths of the metal inserts within their tolerance limits may be compensated for by causing the mold sections forming the elastomer elements to slightly compress the metal inserts lengthwise during the molding operation, such that the mold sections are permitted to move together to within a predetermined distance regardless of variations in the length of the inserts. Thus, the elastomer elements are formed to an accurate predetermined length during the molding operation without requiring an additional grinding step.

Also in the preferred embodiment, the metal insert is provided with a groove formed around the periphery of the insert such that a weakened "hinge" location is formed where the insert wall may crimp inward in response to a force applied axially to the ends of the insert.

Other objects and advantages of the invention will be apparent from the following description, the accompanying drawings, and the appended claims.

DETAILED DESCRIPTION OF THE PREFERRED EMBODIMENT

The invention will now be described with reference to FIG. 1 which shows an elastomer-tipped armature generally designated 10, and which incorporates an insert 12 of the preferred embodiment of the present invention. The armature 10 is useful as a plunger member in an electric solenoid assembly to provide an effective means for forming a seal with associated surfaces of the solenoid assembly and thus controlling the flow of fluids through the assembly.

Figure 1:
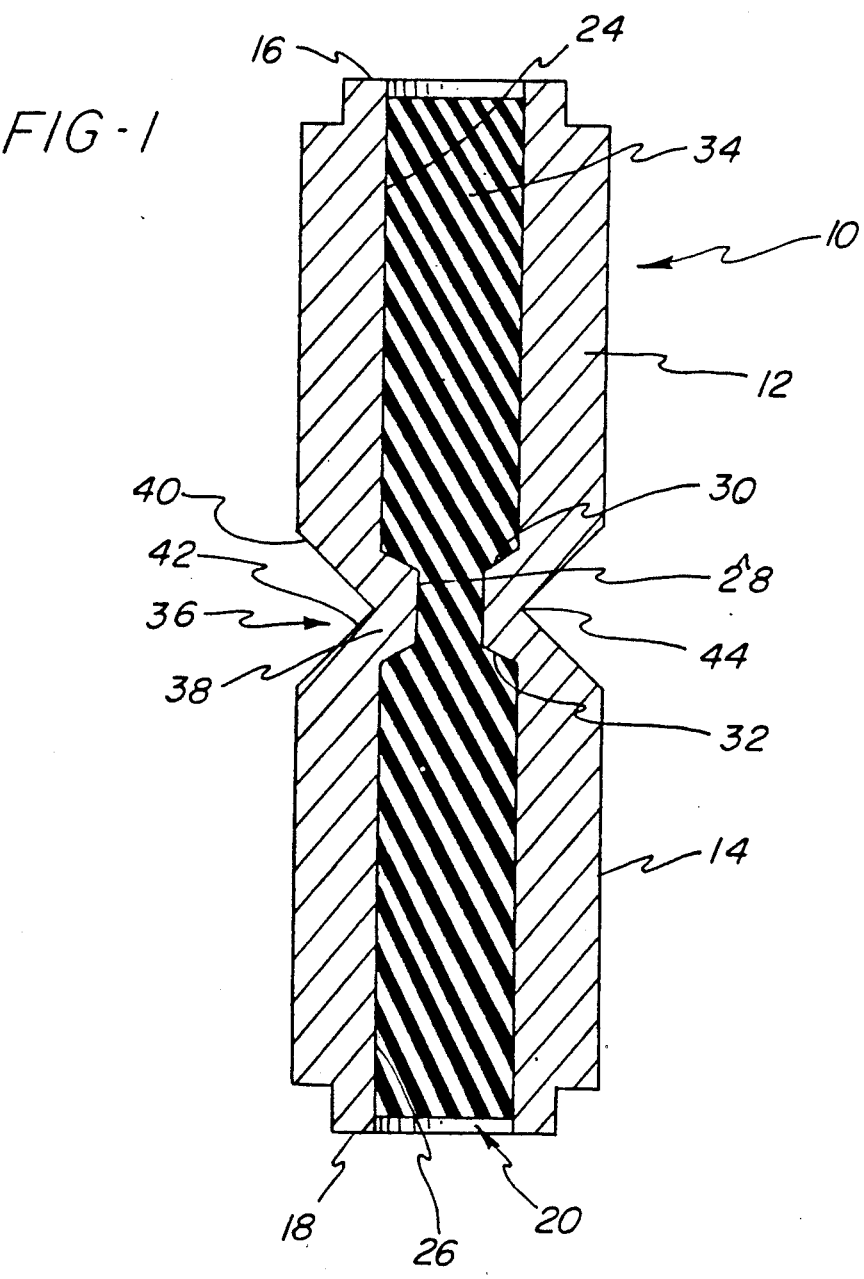
FIG. 1 is a sectional view of an armature incorporating an insert of the present invention.
Figure 2:
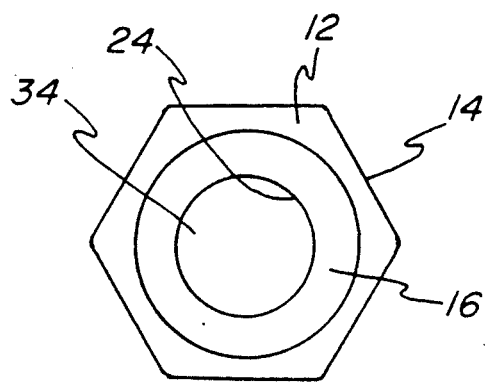
FIG. 2 is an end view of the armature of FIG. 1.

The insert 12 of the preferred embodiment, as seen in FIGS. 1 and 2, is formed as an elongated cylinder having a hexagonal exterior surface 14 with circular end portions 16, 18, however, it should be noted that the exterior may be formed with any one of a variety of other shapes such as a square, circle, triangle or other shape. The insert 12 further includes means defining a hole 20 through the length thereof such that a cylindrical interior wall is formed within the insert 12. Opposite end portions 24, 26 of the interior wall of the insert 12 are formed having the same diameter, and a longitudinally centrally located interior portion 28 of the insert 12 between the end portions 16, 18 is formed with a smaller diameter than the interior end portions 24, 26. The central portion 28 of the insert 12 is connected to the end portions 24, 26 by portions 30, 32 which taper in from the end portions 24, 26 to the central portion 28.

In constructing an armature 10, an interior element 34 formed of an elastomeric material is positioned within the hole 20 in the insert 12 and is in sealing contact with the interior insert walls 24, 26, 28. The elastomer element 34 is preferably molded in place and extends through the length of the insert 12 up to a point adjacent to and slightly recessed from each of the ends 16, 18 of the insert 12. The elastomer element 34 forms a resilient contact surface for forming a seal with another surface of the solenoid assembly, such as a cylindrical orifice member which fits into the end portions of the hole 20 formed in the insert 12, to form a leak-free seal. In addition, the resiliency of the elastomer element 34 provides a relatively soft contact point for avoiding wear of sealing surfaces of the solenoid assembly associated with the armature 10.

During the operation of molding the elastomer element 34 in place, an end of the insert 12 is held against movement by a first mold element and a second mold element is displaced along the longitudinal axis of the insert 12 to engage the opposite end of the insert 12. Typically, in prior art molding operations, the second mold element is displaced until it contacts the insert, at which time the insert would resist and prevent further movement of the mold, and at this point the elastomer element would be molded in place. Thus, in prior art operations the distance from the second mold element to the opposing end of the insert, and therefore the length of the elastomer element, would vary depending on variations within the tolerance of the length of the insert.

The effectiveness of the solenoid assembly in properly acting to control fluid flows is closely related to the precision with which the length of the elastomer element 34 is held to a small tolerance. To this end, the insert 12 is provided with a circumferential groove 36 formed in the hexagonal exterior wall 14 and located approximately midway between the two ends 16, 18 of the insert 12 and adjacent to the smaller diameter interior portion 28. In this manner, a weakened or "hinge" portion 38 of the insert wall is formed which has a decreased resistance to longitudinal forces applied to the ends 16, 18 of the insert 12. The weakened portion 38 of the insert 12 facilitates the precise control of the length of the elastomer element 34 during the molding operation by permitting the insert 12 to be compressed in the longitudinal direction.

In the preferred embodiment, the circumferential groove 36 is formed as a V-shaped recess with opposing walls 40, 42 of the recess forming a 90° angle, with the innermost portion of the groove 36 having a circumference 44 substantially equal to the circumference of the inner wall of the insert 12 at the larger diameter end portions 24, 26 of the hole 20.

As can be seen from the above description, the weakened portion of the wall formed by the groove of the present insert eliminates the problem associated with the variations in the lengths of the inserts. As the mold elements contact the insert of the present invention, the width of the groove decreases and the insert wall crimps inward slightly at the location of the groove such that the insert does not present sufficient resistance to the relative displacement of the mold elements to prevent them from moving after contacting the insert. Thus, the mold elements may be set to move to within a precise predetermined distance of each other, and consequently, the elastomer element is molded to a precise length within the insert. In addition, the longitudinal compressive force applied by the mold elements also acts to control the length of the insert more precisely.

Figure 3:
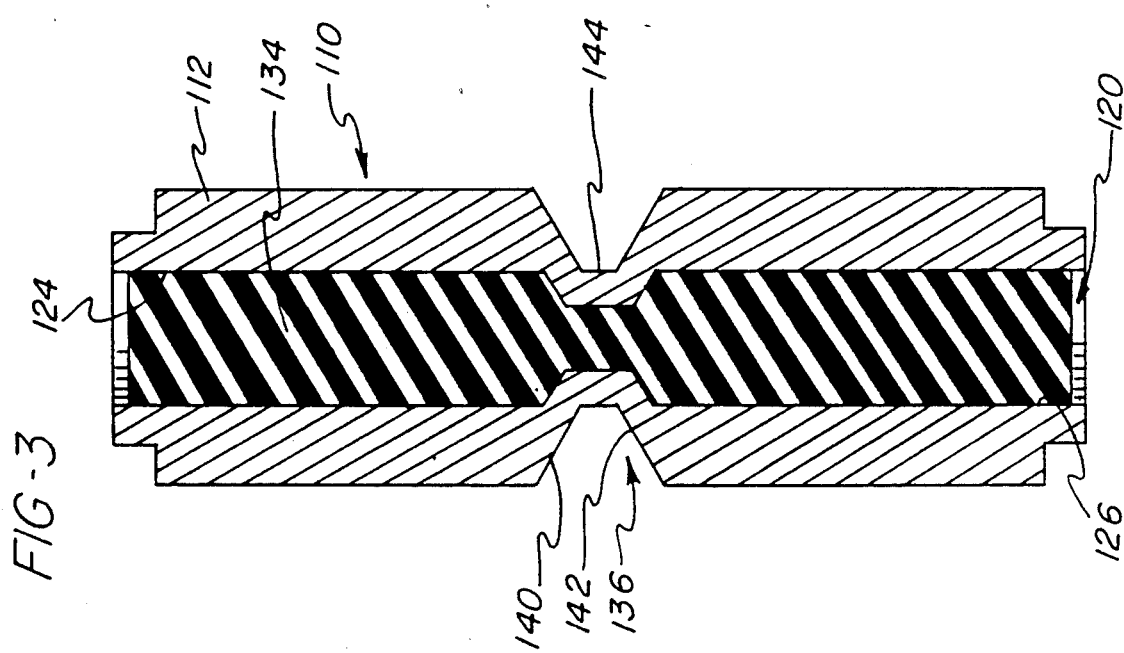
FIG. 3 is a sectional view of an armature incorporating a second embodiment of the insert of the present invention.

In an alternative embodiment, as can be seen in FIG. 3, an armature 110 having an elastomer element 134 is formed using an insert 112 similar to that shown in FIG. 1 except that a groove 136 is provided having walls 140, 142 which slope down to a flat bottom 144 which is formed by a surface which is substantially parallel to the longitudinal axis of the insert 112. In addition, the groove bottom 144 may have a circumference which is approximately equal to the circumference of the inner wall of the insert 112 at the larger diameter end portions 124, 126 of the hole 120.

Figure 4:
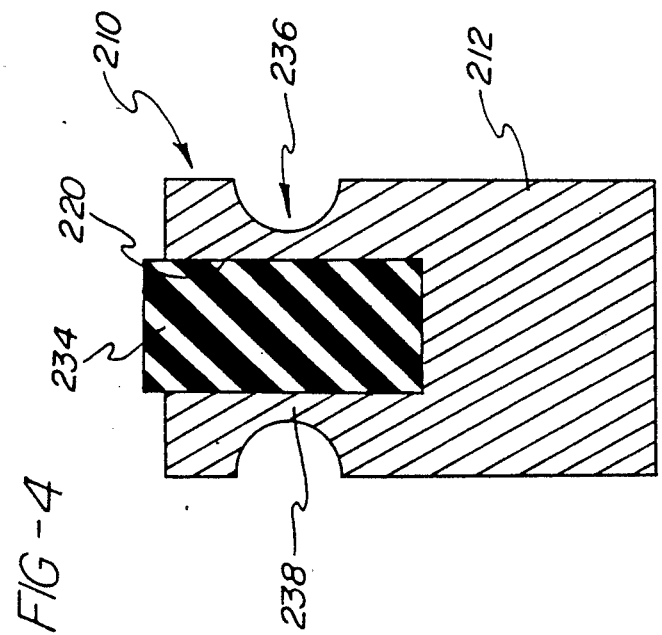
FIG. 4 is a sectional view of an armature incorporating a third embodiment of the insert of the present invention.

FIG. 4 shows another embodiment of the present invention in which an armature 210 is formed with an insert 212 having a hole 220 for receiving the elastomer element 234, wherein the hole 220 passes through only a portion of the length of the insert 212. In this embodiment, the hole 220 is of a constant diameter and the groove 236 is formed as a semi-circular recess at a point along the length of the insert which is adjacent to the hole 220. A thin-walled weakened portion 238 is formed at the location of the groove 236 to decrease the resistance of the insert 212 to a longitudinal compressive force in the same manner as the previous embodiments.

As can be seen from the above embodiments, an insert is provided with a groove which may be formed in a variety of configurations. The shape of the groove is selected such that a compressive force applied to opposite ends of the insert will result in a decrease in the width of the groove and an inward crimping of weakened portion of the wall forming the smaller diameter portion of the hole. Thus, the main consideration in determining the shape and depth of the groove is the effectiveness of the groove in forming a weakened "hinge" area at which the length of the insert can be decreased during the molding of the elastomer element.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. An insert for use in forming an armature, said insert being formed as an elongated malleable member having an outer surface and opposing ends, means defining a hole the entire length of said insert such that an annular wall is formed, a groove formed around the periphery of said outer surface of said insert and located on a side of said annular wall opposite from said means defining said hole and in a plane orthogonal to the longitudinal axis of said insert and said hole having a larger diameter at each of the ends of said insert than at a portion of said hole which intersects said plane containing said groove, said groove forming a structurally weakened point along said insert such that said insert may collapse slightly in a longitudinal direction at said groove when a force is applied to said insert ends.

2. The insert of claim 1 wherein said groove includes opposing walls converging toward one another.

3. The insert of claim 2 wherein said opposing walls of said groove meet at approximately a 90° angle in the bottom of said groove to form a V-shaped recess.

4. The insert of claim 2 wherein said opposing walls of said groove are connected by a surface extending parallel to the longitudinal axis of said insert at the bottom of said groove.

5. The insert of claim 3 or 4 wherein the minimum circumference of said groove is approximately equal to the maximum circumference of said hole.

6. The insert of claim 1 wherein said opposing walls of said groove meet in the bottom of said groove to form a V-shaped recess.

7. A metal insert for use in forming an armature of the type having a rubber element molded within a central interior portion thereof, said armature being formed as an elongated cylinder having a hexagonal exterior surface with circular end portions and means defining a hole through the length of said insert such that a cylindrical interior wall is formed within said insert, said hole at opposite interior end portions of said insert having substantially the same diameter, a portion of said interior wall at a longitudinally central portion of said insert being formed with a smaller diameter than said interior end portions and being joined to said interior end portions along tapered portions leading from said end portions to said smaller diameter portion, a groove formed about the periphery of said exterior surface at said longitudinally central portion of said insert and opposite from said smaller diameter portion of said interior wall, said groove having opposing walls forming a V-shaped recess with said opposing walls of said groove meeting to form a 90° angle, the circumference of said groove where said opposing walls meet being substantially equal to the circumference of said interior end portions whereby said insert wall is structurally weakened with reference to longitudinal compressive forces applied to the ends of said insert such that, upon application of a longitudinal force, said groove may decrease in width and the insert wall may crimp inward at said groove to allow the length of said insert to be decreased.

8. An insert for use in forming an armature, said insert being formed as an elongated malleable member having an outer surface and opposing ends, means defining a hole in at least one end of said insert such that an annular wall is formed, a groove formed as a semi-circular recess around the periphery of said outer surface of said insert and located on a side of said annular wall opposite from said means defining said hole and in a plane orthogonal to the longitudinal axis of said insert, said groove forming a structurally weakened point along said insert such that said insert may collapse slightly in a longitudinal direction at said groove when a force is applied to said insert ends.

* * * * *